United States Patent
Burke

(10) Patent No.: US 7,262,812 B2
(45) Date of Patent: *Aug. 28, 2007

(54) METHOD FOR FINE TUNED AUTOMATIC ZOOM

(75) Inventor: Lawrence A. Burke, Quakertown, PA (US)

(73) Assignee: General Instrument Corporation, Horsham, PA (US)

( * ) Notice: Subject to any disclaimer, the term of this patent is extended or adjusted under 35 U.S.C. 154(b) by 313 days.

This patent is subject to a terminal disclaimer.

(21) Appl. No.: 11/027,244

(22) Filed: Dec. 30, 2004

(65) Prior Publication Data

US 2006/0146148 A1 Jul. 6, 2006

(51) Int. Cl.
*H04N 5/44* (2006.01)
*H04N 9/74* (2006.01)

(52) U.S. Cl. .................. 348/561; 348/581; 348/913

(58) Field of Classification Search ............... 348/561, 348/562, 580–582, 704, 913, 443, 445, 441, 348/458, 459; 382/298–300; H04N 5/44, H04N 9/74, 7/01

See application file for complete search history.

(56) References Cited

U.S. PATENT DOCUMENTS

| 5,136,398 | A | * | 8/1992 | Rodriguez-Cavazos et al. ................. 348/445 |
| 5,161,002 | A | * | 11/1992 | Rodriguez-Cavazos et al. ................. 348/445 |
| 6,366,706 | B1 | * | 4/2002 | Weitbruch ................. 348/445 |

* cited by examiner

*Primary Examiner*—Sherrie Hsia
(74) *Attorney, Agent, or Firm*—Benjamin D. Driscoll

(57) ABSTRACT

A system and method for fine tuned automatic zooming "in" and "out" a video content stream to adjust for Ratio Mismatches and changes in Pillar Bar size is disclosed. The present invention is particularly applicable to 4:3 video content delivered in a 16:9 video content stream. After the Initial Zoom In, the present invention repeatedly analyses the pixels in the Truncated Display for Pillar Bars and determines (i) if the Pillar Bars are still present, (ii) if the Pillar Bars have changed width/size, and (iii) if the amount of the Initial Zoom In (or subsequent zoom prior to an instant fine tune iteration) was correct (within a margin of error), and automatically fine tunes the zooming of the video content stream accordingly, e.g., gradual zooming in, gradual zooming out, or a full zoom out for a full pixel presentation if the Pillar Bars are no longer present.

38 Claims, 3 Drawing Sheets

FIG. 2(a)
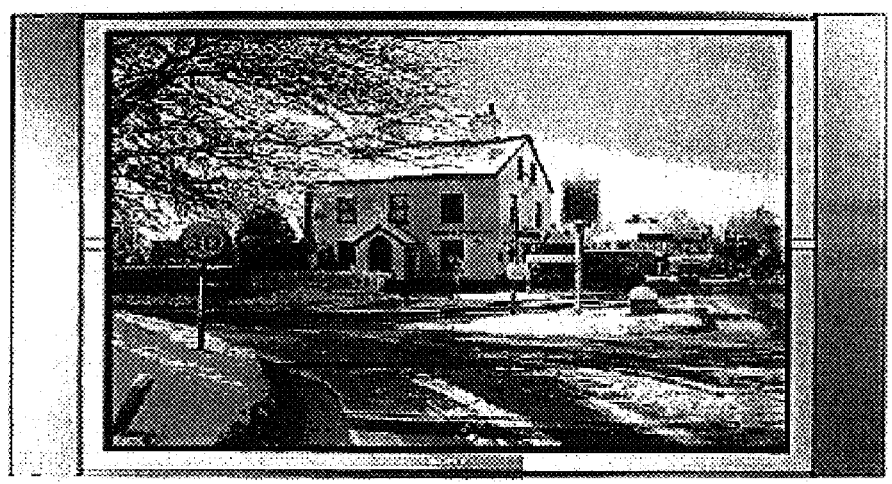
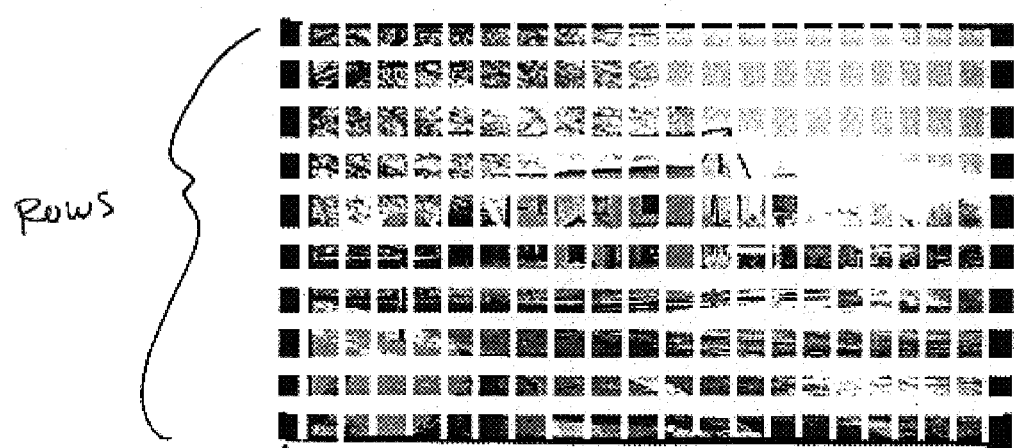
Rows
Columns
FIG. 2(b)
Portion of Pillar Bar in Over Scan region

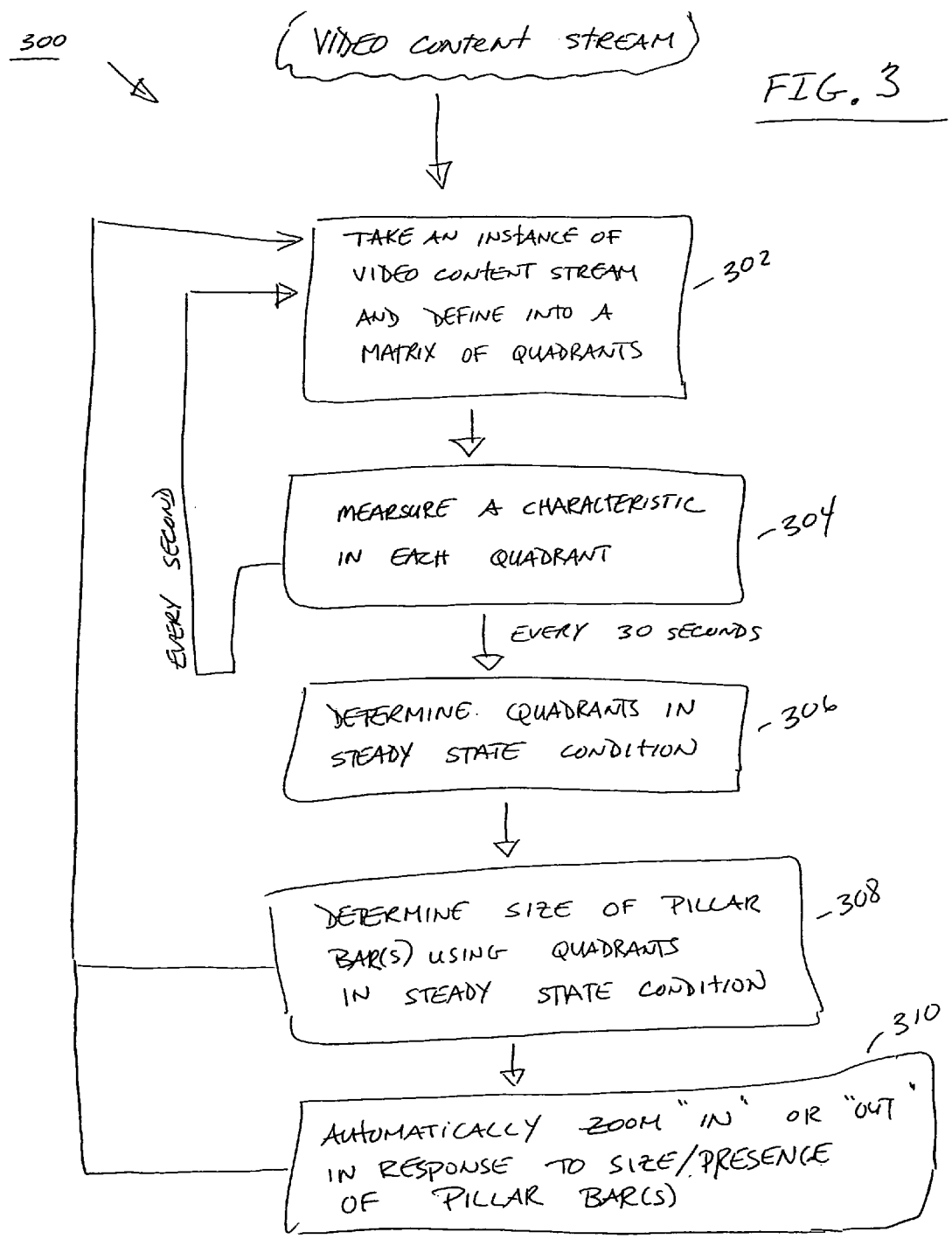

METHOD FOR FINE TUNED AUTOMATIC ZOOM

FIELD OF THE INVENTION

The present invention relates to digital video signals. More specifically, the present invention relates to digital video content ratios in a digital video stream.

BACKGROUND OF THE INVENTION

Today broadcast video content is available in both a 4:3 ratio and 16:9 ratio formats. Typically, standard definition ("SD") broadcast video is sent in 4:3 and high definition ("HD") broadcast video is sent in 16:9. However, sometimes television broadcasters send HD video signals containing programs that were originally filmed in the 4:3 format ("Ratio Mismatch"). In this instance, the HD broadcaster must add vertical bars ("Pillar Bars") to the left and right sides of the picture to fill the entire 16:9 HD display area. These Pillar Bars are typically black in color, but also may be gray, or some other color or graphic.

In the case of a Ratio Mismatch where 16:9 content is sent in a 4:3 video stream, horizontal Pillar Bars are added to the top and bottom of the picture to fill the entire 4:3 display area. Horizontal Pillar Bars are also commonly referred to as "Letterbox Bars". As used herein the term "Pillar Bars" is used with reference to both vertical (left and right) bars and horizontal (top and bottom) bars.

To compensate for the above-described Ratio Mismatch, 16:9 HD televisions/displays and set top boxes typically have a manual "Zoom" function. The "Zoom" function is usually implemented via a button on an associated remote control to (i) stretch the image horizontally to remove the Pillar Bars thereby compromising the aspect ratio, or (ii) stretch the image both horizontally and vertically thereby filling the display and preserving aspect ratio, while sacrificing a portion of the top and bottom of the image. (The "Zoom" feature can also prevent uneven display degradation on plasma monitors.) This manual "Zoom" process is totally controlled by the end user and can be imprecise, inconsistent, and time consuming because the end user is required to press a button(s) on the remote control and step/cycle through Zoom states. Further, when the video content changes ratio (the Pillar Bars disappear or change size, for example), the end user will again have to re-adjust the Zoom, either "in" or "out" manually. In addition, if the video content changes ratio when the end user is performing their manual Zoom, the end user will become highly frustrated, as the end user attempts to Zoom to compensate for a ratio which has since passed. An end user's only other option is to select a static zoom setting, which may under or over Zoom depending on the Ratio Mismatched video content size.

Thus, what is needed is a method which provides a more consistent and efficient process for zooming "in" and "out" a video content stream to adjust for Ratio Mismatches and changes in the Pillar Bars.

SUMMARY OF INVENTION

An object of the present invention is to provide for a fine tuned automatic zooming "in" and "out" of a video content stream to adjust for Ratio Mismatches and changes in the Pillar Bars for displays which do allow for analysis of all pixels in the video content stream after a zoom "in" has been performed ("Truncated Displays").

In order to achieve this objective, as well as others which will become apparent in the disclosure below, the present invention provides for a fine tuned automatic zoom method for automatically zooming "in" and "out" a video content stream to adjust for Ratio Mismatches and changes in the Pillar Bars for Truncated Displays. The present invention is particularly applicable to 4:3 video content delivered in a 16:9 video content stream, which is often found in HD video content streams.

In an exemplary embodiment of the present invention, the end user selects the desired Auto-Zoom setting on their television, video display, or video set top box at the time of initial setup. Such setting would preferably be a one dimensional, horizontal or vertical zoom only (for vertical and horizontal Pillar Bars, respectively); or a two dimensional zoom, intended to preserve aspect ratio. The present invention then scans for the presence of Pillar Bars. When Pillar Bars are detected by the present invention, after waiting a pre-determined period to confirm the presence and size of the Pillar Bars, the present invention slowly initiates a stretching of the video content stream to eliminate the Pillar Bars (in accordance with the Auto-Zoom setting (above)) plus a small portion of the Pillar Bars to complete an initial zoom "in" ("Initial Zoom In").

After the Initial Zoom In, in accordance with an exemplary embodiment of the present invention, the inventive method repeatedly analyses the pixels in the Truncated Display for Pillar Bars and determines (i) if the Pillar Bars are still present, (ii) if the Pillar Bars have changed width/size, and (iii) if the amount of the Initial Zoom In (or subsequent zoom prior to an instant fine tune iteration) was correct (within a margin of error), and automatically fine tunes the zooming of the video content stream accordingly, e.g., gradual zooming in, gradual zooming out, or a full zoom out for a full pixel presentation if the Pillar Bars are no longer present.

Thus, the present method provides for a fine tuned automatic zooming "in" and "out" a video content stream to adjust for Ratio Mismatches and changes in the Pillar Bars in Truncated Displays.

BRIEF DESCRIPTION OF THE DRAWINGS

For a complete understanding of the present invention and the advantages thereof, reference is now made to the following description taken in conjunction with the accompanying drawings in which like reference numbers indicate like features, components and method steps, and wherein:

FIG. 2(a) is an illustration of the viewable area of 4:3 content transmitted in a 16:9 video bit stream in a Truncated Display after Initial Zoom In in accordance with an exemplary embodiment of the present invention for use with FIG. 2(b); and FIG. 2(b) is an illustration of the over-scan regions of 4:3 content transmitted in a 16:9 video bit stream after Initial Zoom In in a Truncated Display in accordance with an exemplary embodiment of the present invention; and FIG. 3 is an illustration of the basic process flow of the method for a fined tuned automatic zooming "in" and "out" a video content stream to adjust for Ratio Mismatches and changes in the Pillar Bars for Truncated Displays in accordance with an exemplary embodiment of the present invention.

DESCRIPTION OF A PRESENTLY PREFERRED EMBODIMENT

Figure 1A:
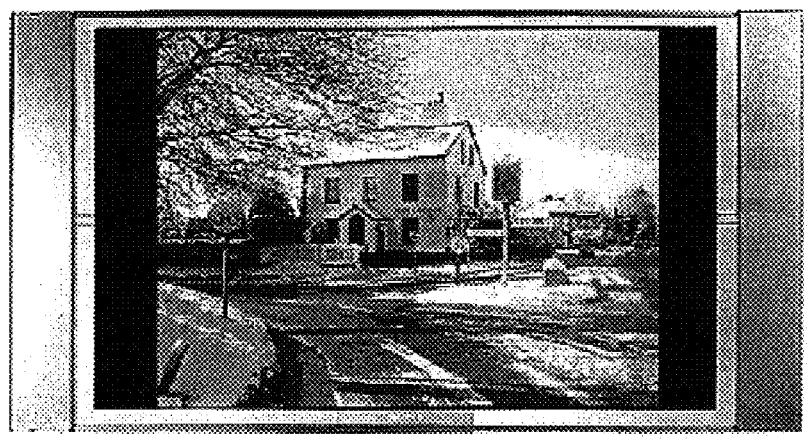
FIG. 1(a) is an illustration of 4:3 content transmitted in a 16:9 video bit stream.

FIG. 1.(a) is an illustration of an instance of a 16:9 video stream where the broadcaster has sent 4:3 video content and has used left and right Pillar Bars to fill the remainder of the pixel space ("Ratio Mismatch"). This type of transmission is most typically used when a HD broadcaster is transmitting 4:3 video content in their 16:9 video content stream. Further the display of FIG. 1(a) is a "Truncated Display", meaning that after content is zoomed "in", whether automatically using the inventive method described below or manually, pixels which have been zoomed out (although still in the video content stream from the source) are unavailable for the inventive Pillar Bar analysis described below.

The present invention provides for a method for a fined tuned automatic zooming "in" and "out" a video content stream to adjust for Ratio Mismatches and changes in the Pillar Bars in Truncated Displays.

Figure 1B:
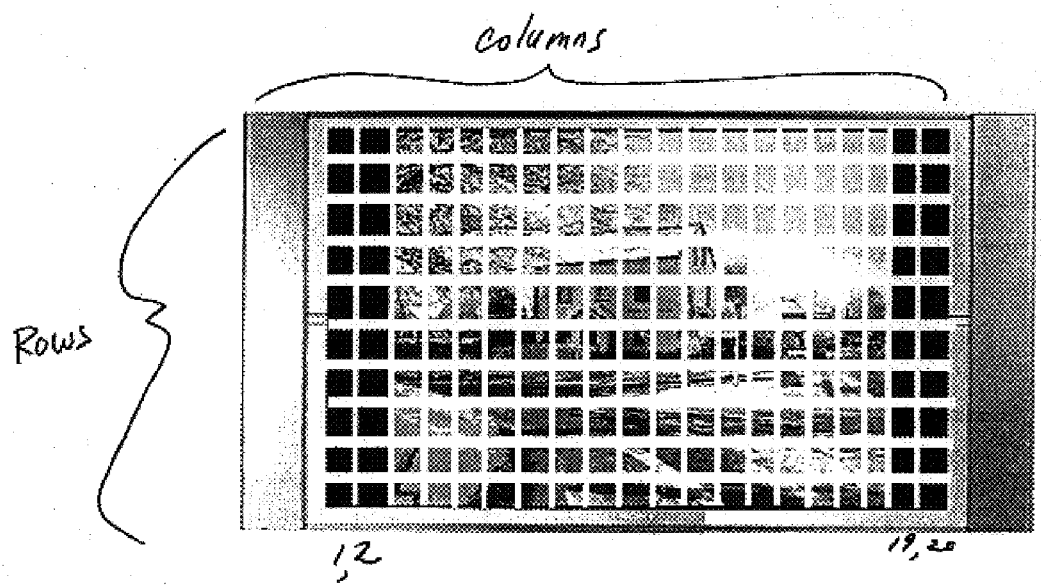
FIG. 1(b) is an illustration of 4:3 content transmitted in a 16:9 video bit stream with a matrix overlay in accordance with an exemplary embodiment of the present invention.

Referring to FIG. 1.(b) and FIG. 3, the system and method of the present invention begin by (a) defining an instance of a video content stream into a matrix of quadrants, in a matrix component, in step 302, as can be seen in the exemplary instance in of FIG. 1.(b). A 10×20 matrix is used in FIG. 1(b) simply as an illustrative example. Preferably a 72×48 matrix is used. However, any matrix size, up to and including the full resolution of the video source, can be used.

Next, the present invention (b) measures a characteristic in each quadrant of the matrix of that instance, in a measuring component, in step 304. Such characteristic may include luminance and/or chrominance, for example. Preferably luminance of the pixels in each quadrant is the characteristic measured in step (b) 304 because by using luminance, the present invention can analyze Pillar Bars of any color or pattern, e.g., black, gray, graphics, etc.

The present invention then repeats steps (a) 302 and (b) 304 for a number of iterations, to (c) determine which quadrants have the characteristic in a steady state condition, in a determining component, in step 306. In this exemplary embodiment, steps (a) 302 and (b) 304 are repeated for 30 cycles with a one (1) second interval between each cycle. However, there are numerous variants for the number of cycles and interval therebetween, which can be determined by one of ordinary skill in the art.

After quadrants which are in a steady state are determined, in step (d) 306, the present invention uses that steady state quadrant determination to (d) determine the size of the Pillar Bars in the video content stream, in a size component, in step 308. In an exemplary embodiment, in step (d) 308, the present invention evaluates each row in the matrix for quadrants determined in step (c) 304 to be in a steady state condition. After analyzing each row, the present invention derives the number of columns in the matrix with all quadrants in a steady state condition (also can be described as "lowest number of quadrants in a steady state condition across all rows of the matrix"). The resultant number equals the width of the Pillar Bars in terms of quadrant columns (left and right). Referring to FIG. 1(b), the number of columns in the matrix with all quadrants in a steady state condition would be 4.

For efficiency purposes, the present invention may simply analyze half of each row to determine the width of one Pillar Bar. For example, if only the first half of each row is analyzed for steady state quadrants, the width of the left Pillar Bar can be determined. In this case, the present invention assumes the right Pillar Bar is of comparable width and, thus, will still arrive at the width of the Pillar Bars.

After determining the resultant number of columns in the matrix with all quadrants in a steady state condition, the present invention horizontally zooms in the video content stream to an amount equal to the resultant number of columns of the Pillar Bars plus a small portion of the Pillar Bars on each side (left and right) of the Truncated Display, in an automatic zoom component, in step 310. The resultant "zooming in" can be seen in FIG. 2(a) in a Truncated Display. (The type of Auto-Zoom (one-dimensional or two dimensional) used can be end user defined as described above.) Referring to FIG. 2(b), the small portion is preferably hidden, either fully or partially, from the end user in the over-scan region. Preferably the small portion is one column on each side (left and right) of the Truncated Display.

After completing an Initial Zoom In in step (d) 308, the present invention returns to step (a) 302 and begins the process again to start an inventive fine tuning of the Initial Zoom In (or subsequent zoom prior to an instant fine tune iteration). Preferably, the time interval between the completion of step (d) 306 and returning to step (a) 302 to begin the inventive method again is one (1) second. In this way the present invention repeatedly analyses the pixels (available for analysis) in a Truncated Display for Pillar Bars, and determines (i) if the Pillar Bars are still present, (ii) if the Pillar Bars have changed width/size, and (iii) if the amount of the Initial Zoom In (or subsequent zoom prior to an instant fine tune iteration) was correct (within a margin of error), and automatically fine tunes the zooming of the video content stream accordingly, e.g., gradual zooming in, gradual zooming out, or a full zoom out for a full pixel presentation if the Pillar Bars are no longer present. FIG. 2(b) also illustrates the recursive process described above as a matrix is still overlaid over an instance of the video content stream for repeated quadrant steady state condition analysis.

After the Initial Zoom In iteration, the present invention adds the following inventive method to steps (a) through (d) described above:

In a given iteration, if the resultant number of columns in the matrix with all quadrants in a steady state condition is within a pre-determined range (target acceptable range) no fine tuning performed. In this exemplary embodiment, the pre-determined range, "x", is 2>x>1.

In a given iteration, if the resultant number of columns, "y", in the matrix with all quadrants in a steady state condition is not within a pre-determined range (target acceptable range) inventive fine tuning is performed to gradual zooming in, gradual zooming out, or full zoom out, for a full pixel presentation (if the Pillar Bars are no longer present), as described below. Again, in this exemplary embodiment, the pre-determined range, "x", is $2 \geq x \geq 1$.

If the resultant number of columns in the matrix with all quadrants in a steady state condition is greater than the pre-determined range (y>x), the video content stream is slowly zoomed "in" a pre-defined number of columns on each side (left and right) of the video content stream. Preferably the pre-defined number of columns equals one column on each side (left and right) of the video content stream.

If the resultant number of columns in the matrix with all quadrants in a steady state condition is less than the pre-determined range (y<x), the video content stream is slowly zoomed "out" a pre-defined number of columns on each side (left and right) of the video content stream. Preferably the pre-defined number of columns equals one column on each side (left and right) of the video content stream.

In the event that y<x in a number of pre-defined consecutive cycles of the present invention, the present invention zooms "out" the video content stream to a full pixel presentation. Preferably the number of pre-defined consecutive cycles is 4. After 4 consecutive y<x determinations it is presumed to that the Pillars Bars are no longer present in the video content stream.

Thereafter, analysis beginning with step (a) 302 begins again for a repeat of the above described inventive fine tuning method to continue fine tuning as needed.

The above described inventive fine tuning of zoom advantageously (i) fine tunes the amount of an Initial Zoom In (or subsequent zoom prior to an instant fine tune iteration) to ensure that the amount of zooming is correct (within a margin of error), and (ii) adjusts for changes in the video content stream, e.g., 4:3 to 16:9, 16:9 to 4:3, other Pillar Bar size changes.

Using the same inventive system and method described above, top and bottom Pillar Bars can be determined and eliminated by zooming "in" and fined tuned as described above. In this instance, step (d) would comprise determining the number of rows in the matrix with all quadrants in a steady state condition (also can be described as "lowest number of quadrants in a steady state condition across all columns of the matrix"). This is useful when presenting 16:9 content in a 4:3 video stream, such as playing a 16:9 DVD movie on your DVD player which is outputting a 4:3 video content stream. Further, the inventive technique of fine tuning may also be employed using the same inventive method described above, except that instead of columns being added or deleted, top and bottom rows are added or deleted to fine tune "in" or "out" the video content stream, respectively.

Thus, the present method provides for a fine tuned automatic zooming "in" and "out" a video content stream to adjust for Ratio Mismatches and changes in the Pillar Bars in Truncated Displays.

Although the invention has been described herein by reference to an exemplary embodiment thereof, it will be understood that such embodiment is susceptible of modification and variation without departing from the inventive concepts disclosed. For example, although described herein after the Initial Zoom In described above, the inventive fine tuning may also start after a manual zoom "in" or other automatic zoom "in" other than that described above. All such modifications and variations, therefore, are intended to be encompassed within the spirit and scope of the appended claims.

I claim:

1. A method for fine tuning zooming of a video content stream, said method comprising:
   (a) defining an instance of a video content stream into a matrix of quadrants;
   (b) measuring a characteristic in each quadrant of said matrix of said instance;
   (c) determining quadrants wherein said characteristic is in a steady state condition; and
   (d) determining a number of columns in said matrix with all quadrants in a steady state condition.

2. The method of claim 1 further comprising the step of returning to step (a) after completing step (b).

3. The method of claim 2 further comprising the step of returning to step (a) one second after completing step (b).

4. The method of claim 1, wherein step (d) further comprises the step of, if less than a full pixel representation of said video content stream is in said matrix and if said determined number of columns in said matrix with all quadrants in a steady state condition is greater than a predefined range of columns in said matrix with all quadrants in a steady state condition, zooming in said video content stream a predefined number of columns on each side of said video content stream.

5. The method of claim 4, wherein said predefined range, x, is $2 \geq x \geq 1$.

6. The method of claim 4, wherein said predefined number of columns on each side is 1.

7. The method of claim 4, wherein said zooming in comprises horizontally zooming in said video content stream.

8. The method of claim 7, wherein said zooming in further comprises vertically zooming in said video content stream in proportion to said horizontal zooming in to preserve an aspect ratio of said video content stream.

9. The method of claim 1, wherein step (d) further comprises, if less than a full pixel representation of said video content stream is in said matrix and if said determined number of columns in said matrix with all quadrants in a steady state condition, y, is less than a predefined range of columns in said matrix with all quadrants in a steady state condition, x, zooming out said video content stream a predefined number of columns on each side of said video content stream.

10. The method of claim 9, wherein if y<x for a predefined number of consecutive iterations of steps (a) through (d), zooming out said video content stream to a full pixel representation.

11. The method of claim 10, wherein said predefined number of consecutive iterations equals 4.

12. The method of claim 9, wherein said predefined range, x, is $2 \geq x \geq 1$.

13. The method of claim 9, wherein said predefined number of columns on each side is 1.

14. The method of claim 9, wherein said zooming out comprises horizontally zooming out said video content stream.

15. The method of claim 14, wherein said zooming out further comprises vertically zooming out said video content stream in proportion to said horizontal zooming out to preserve an aspect ratio of said video content stream.

16. The method of claim 1 further comprising the step of repeating step (a) followed by step (b) 30 times before proceeding to step (c).

17. The method of claim 1 further comprising the step of returning to step (a) after completing step (d).

18. The method of claim 17 further comprising the step of returning to step (a) one second after completing step (d).

19. The method of claim 1, wherein said characteristic comprises at least one of luminance and chrominance.

20. A method for fine tuning zooming of a video content stream, said method comprising:
   (a) defining an instance of a video content stream into a matrix of quadrants;
   (b) measuring a characteristic in each quadrant of said matrix of said instance;
   (c) determining quadrants wherein said characteristic is in a steady state condition; and
   (d) determining a number of rows in said matrix with all quadrants in a steady state condition.

21. The method of claim 20 further comprising the step of returning to step (a) after completing step (b).

22. The method of claim 21 further comprising the step of returning to step (a) one second after completing step (b).

23. The method of claim 20, wherein step (d) further comprises, if less than a full pixel representation of said video content stream is in said matrix and if said determined number of rows in said matrix with all quadrants in a steady state condition is greater than a predefined range of rows in said matrix with all quadrants in a steady state condition, zooming in said video content stream a predefined number of rows on each side of said video content stream.

24. The method of claim 23, wherein said predefined range, x, is $2 \geq x \geq 1$.

25. The method of claim 23, wherein said predefined number of rows on each side is 1.

26. The method of claim 23, wherein said zooming in comprises vertically zooming in said video content stream.

27. The method of claim 23, wherein said zooming in further comprises horizontally zooming in said video content stream in proportion to said vertical zooming in to preserve an aspect ratio of said video content stream.

28. The method of claim 20, wherein step (d) farther comprises, if less than a full pixel representation of said video content stream is in said matrix and if said determined number of rows in said matrix with all quadrants in a steady state condition, y, is less than a predefined range of rows in said matrix with all quadrants in a steady state condition, x, zooming out said video content stream a predefined number of rows on each side of said video content stream.

29. The method of claim 28, wherein if y<x for a predefined number of consecutive iterations of steps (a) through (d), zooming out said video content stream to a full pixel representation.

30. The method of claim 29, wherein said predefined number of consecutive iterations equals 4.

31. The method of claim 28, wherein said predefined range, x, is $2 \geq x \geq 1$.

32. The method of claim 28, wherein said predefined number of rows on each side is 1.

33. The method of claim 28, wherein said zooming out comprises vertically zooming out said video content stream.

34. The method of claim 33, wherein said zooming out further comprises horizontally zooming out said video content stream in proportion to said vertical zooming out to preserve an aspect ratio of said video content stream.

35. The method of claim 20 further comprising the step of repeating step (a) followed by step (b) 30 times before proceeding to step (c).

36. The method of claim 20 further comprising the step of returning to step (a) after completing step (d).

37. The method of claim 36 further comprising the step of returning to step (a) one second after completing step (d).

38. The method of claim 20, wherein said characteristic comprises at least one of luminance and chrominance.

* * * * *